US010461997B2

(12) United States Patent
Suzuki et al.

(10) Patent No.: US 10,461,997 B2
(45) Date of Patent: Oct. 29, 2019

(54) INFORMATION PROCESSING DEVICE AND PROGRAM

(71) Applicant: OMRON Corporation, Kyoto-shi, Kyoto (JP)

(72) Inventors: Yuji Suzuki, Kusatsu (JP); Takamasa Ueda, Kusatsu (JP); Makoto Okuno, Kusatsu (JP)

(73) Assignee: OMRON Corporation, Kyoto-shi (JP)

( * ) Notice: Subject to any disclaimer, the term of this patent is extended or adjusted under 35 U.S.C. 154(b) by 462 days.

(21) Appl. No.: 14/651,277

(22) PCT Filed: Dec. 13, 2013

(86) PCT No.: PCT/JP2013/083443
§ 371 (c)(1),
(2) Date: Jun. 11, 2015

(87) PCT Pub. No.: WO2014/092178
PCT Pub. Date: Jun. 19, 2014

(65) Prior Publication Data
US 2015/0312095 A1 Oct. 29, 2015

(30) Foreign Application Priority Data
Dec. 14, 2012 (JP) .................................. 2012-273876

(51) Int. Cl.
*H04L 12/24* (2006.01)
*G06F 3/0484* (2013.01)
*H04L 12/26* (2006.01)

(52) U.S. Cl.
CPC ........ *H04L 41/0803* (2013.01); *G06F 3/0484* (2013.01); *H04L 43/045* (2013.01)

(58) Field of Classification Search
CPC ... H04L 41/0803; H04L 43/045; G05B 19/05; G05B 2219/13176; G05B 2219/15078;
(Continued)

(56) References Cited

U.S. PATENT DOCUMENTS 5,802,389 A * 9/1998 McNutt ................ G05B 19/054
710/1
2004/0215779 A1* 10/2004 Weber ...................... G06F 1/26
709/226
(Continued)

FOREIGN PATENT DOCUMENTS

EP 1427083 A1 6/2004
JP 2011-008581 A 1/2011
(Continued)

OTHER PUBLICATIONS

JP2011008581 Tranlsation, Espacenet.*

*Primary Examiner* — Chun Cao
(74) *Attorney, Agent, or Firm* — Metrolex IP Law Group, PLLC

(57) ABSTRACT

The convenience of a design of a system is improved by making it easier to verify consumed electric power when designing and constructing the system. An operation screen is displayed upon execution of on a PC for supporting the design of a control system. The configuration of a control system can be controlled in an editing region, and unit images representing an I/O unit are connected in order to a unit image representing a communication coupler. A power supply unit can be inserted into this configuration. An icon indicates a shortage of electric power to the units downstream of the unit indicated by a selected image. When a user mouses the pointer over the icon, the detailed meaning of the icon is displayed in a message. The designer is thus capable of easily verifying the position at which a power source supply unit should be added.

16 Claims, 8 Drawing Sheets

(58) Field of Classification Search
CPC ........... G05B 2219/13185; G05B 2219/15097; G06F 3/0484; G06F 17/5054; G06F 17/5009; G06F 11/324; G06F 2217/78
USPC ........................................................ 700/286
See application file for complete search history.

(56) References Cited

U.S. PATENT DOCUMENTS

| | | | |
|---|---|---|---|
| 2006/0206217 A1* | 9/2006 | Fujii ..................... | G05B 19/05 700/18 |
| 2009/0143922 A1* | 6/2009 | Juricak ................ | B60W 10/30 701/1 |
| 2013/0241586 A1* | 9/2013 | Horikawa .......... | G01R 31/3187 324/750.3 |

FOREIGN PATENT DOCUMENTS

| | | | | |
|---|---|---|---|---|
| JP | WO2012077210 | * | 6/2012 | ............ G05B 23/02 |
| JP | 2012-155431 A | | 8/2012 | |
| JP | 2012-195653 A | | 10/2012 | |
| JP | 2012-237764 A | | 12/2012 | |

* cited by examiner

FIG.5(A)

| Unit information | |
|---|---|
| Formal name | NX-PDXXXX |
| Product name | Unit power source additional supply unit |
| Suppliable electric power | 10.00 (W) |
| | |

FIG.5(B)

| Unit information | |
|---|---|
| Formal name | NX-IDXXXX |
| Product name | DC input unit |
| Consumed electric power | 0.50 (W) |
| | |

INFORMATION PROCESSING DEVICE AND PROGRAM

TECHNICAL FIELD

The present invention relates to techniques for supporting designs, settings and the like of control systems, which are utilized for controlling operations of machines and equipment and the like.

BACKGROUND ART

Machines and equipment used in many production sites are typically controlled by control systems constituted by programmable controllers (programmable logic controllers, also referred to as "PLCs", hereinafter). In such control systems, the PLC includes a CPU unit (central processing unit), and an I/O (input/output) unit, which receives signals from external switches and sensors and outputs the signals to external relays and actuators. The PLC is connected over a network to a plurality of remote I/O terminals. Each remote I/O terminal includes a communication coupler and a plurality of I/O units.

As one such control system, JP 2012-195653 A (patent document 1) discloses a network system constituted by a master device and a plurality of slave devices and a technique for detection of connection abnormalities of the slave devices. The data transmitted from the master device is returned back to the master device after being transmitted sequentially from the most upstream slave device to the most downstream slave device.

In order to support the design and construction of such control systems, software has been proposed for simulating configurations of control systems with PCs (personal computers) and setting the control systems. With this software, it is possible for designers of the control systems to consider configurations of devices (units) included in the control devices before purchasing an apparatus, and to design the control systems in consideration of the properties of the units.

PRIOR ART DOCUMENTS

Patent Documents

Patent Document 1: JP 2012-195653A

SUMMARY OF THE INVENTION

Problem to be Solved by the Invention

When designers configure control systems, the control system is preferably designed to achieve an optimum performance of the system, and an optimum total consumption of electric power for assuring safety in devices. Some software systems display the total consumption of electric power in the overall control system. However, if it is not easy for the designers and the like to verify the total consumption of electric power for individual units constituting the control system, it is also difficult to decide the capability of the electric source supply unit for supplying electric power to these units, for example. Therefore, it is necessary to provide a technique which allows the designers and so on to easily simulate by software the optimum total consumption of electric power and the configuration of units included in the control system.

The present invention has been accomplished to solve the above problem, and is aimed to provide a technique which facilitates the verification of the consumption of electric power when designing and configuring FA (factory automation) systems and the like, in order to improve the convenience of system design.

SUMMARY OF THE INVENTION

An information processing device according to an embodiment is aimed to support construction of a network which is constituted by plural kinds of units. The plural kinds of units include an electric power supply unit for supplying electric power to units connected downstream from the electric power supply unit, and a connected unit operating with a supply of electric power received from a unit upstream from the connected unit and having a function of supplying remaining electric power to a unit downstream from the connected unit. The information processing device comprises a memory portion for storing an electric power consumed by the connected unit and an electric power that is suppliable by the electric power supply unit, a configuration portion for virtually configuring, in response to an input operation, a network including the connected unit and the electric power supply unit, a determination portion for determining, for each of the units included in the virtually configured network, whether there is an overage or shortage of electric power to be supplied to the unit, on the basis of the electric power that is suppliable by the electric power supply unit upstream from that unit, the electric power consumed by one or more connected units upstream from that unit, and the electric power consumed by that unit, and a display portion for displaying a state of the electric power supply for each of the units included in the virtually configured network, depending on a determination result determined by the determination portion.

It is preferable that the determination portion determines whether there is an overage or shortage of electric power to be supplied to a unit by comparing the electric power that is suppliable by the electric power supply unit upstream and nearest to that unit with the sum of the electric power consumed by that unit and the electric power consumed by one or more consecutive connected units downstream from the nearest electric power supply unit upstream from that unit.

It is preferable that the determination portion determines whether there is an overage or shortage of electric power to be supplied to a unit by calculating a value obtained by subtracting, from the suppliable electric power of the electric power supply unit upstream and nearest to that unit, the electric power consumed by one or more consecutive connected units upstream from that unit and downstream from the electric power supply unit nearest to that unit, and comparing the obtained value with the electric power consumed by that unit.

It is preferable that the configuration portion receives an input operation for updating a virtual configuration of the plurality of units in the network, and in response to an input operation, the determination portion determines, for each of the units included in the updated network, whether there is an overage or shortage of electric power to be supplied to the unit.

It is preferable that the display portion displays a virtual configuration of the network, and displays a predetermined image in association with any of the plurality of units included in the virtual configuration that is determined by the determination portion to have a shortage of electric power to be supplied.

It is preferable that the display portion displays the virtual configuration of the network, displays a predetermined image in accordance with the determination result of the determination portion in association with each of the plurality of units included in the virtual configuration, and displays text information indicating the determination result of the determination portion in response to an input operation regarding the image.

According to another embodiment, a program for controlling an operation of an information processing device is provided. The information processing device is adapted to support construction of a network that is constituted by plural kinds of units. The plural kinds of units include an electric power supply unit for supplying electric power to units connected downstream from the electric power supply unit, and a connected unit operating with a supply of electric power received from a unit upstream from the connected unit and having a function of supplying remaining electric power to a unit downstream from the connected unit. The information processing device comprises a processor and a memory for storing an electric power consumed by the connected unit and an electric power that is suppliable by the electric power supply unit. The program is configured to execute the following steps on the processor: a step of virtually configuring a network including the connected unit and the electric power supply unit, in response to an input operation on the information processing device, a step of determining, for each of the units included in the virtually configured network, whether there is an overage or shortage of electric power to be supplied to the unit, on the basis of the electric power that is suppliable by the electric power supply unit upstream from that unit, the electric power consumed by one or more connected unit upstream from that unit, and the electric power consumed by that unit, and a step of displaying, on a monitor, a state of the electric power supply for each of the units included in the virtually configured network, depending on the determination result.

Advantageous Effect of the Invention

An information processing device according to an embodiment displays, for each unit in a system configuration for supplying electric power from an power source unit to a plurality of units, states of electric power supply to the units, making it possible to improve the convenience of designing networks and the like for designers.

The above and other objectives, characteristics, aspects and advantages in the present invention will be clearly understood by the detailed explanation of the present invention described below with reference to attached drawings.

BRIEF DESCRIPTION OF THE DRAWINGS

FIGS. 5(A), 5(B) are diagrams showing unit information 19, that is, information for the individual units shown in a device profile 13.

EMBODIMENTS OF THE INVENTION

Hereinafter, embodiments of the present invention will be described with reference to drawings. In the following explanations, the like symbols is assigned to like components. This also applies to their names and functions. Therefore, these will not be explained in detail repeatedly.

Overview of Network Configuration

An information processing device according to one embodiment is connected to a control system constituted by a PLC or the like, and serves as a PLC support device by executing of support software for supporting (aiding) the construction of the control system. The information processing device explained in this embodiment has a function for simulating the configuration of the control system by executing the support software, and receives settings for the operation of the control system by users. First, the configuration of the control system will be explained.

Figure 1:
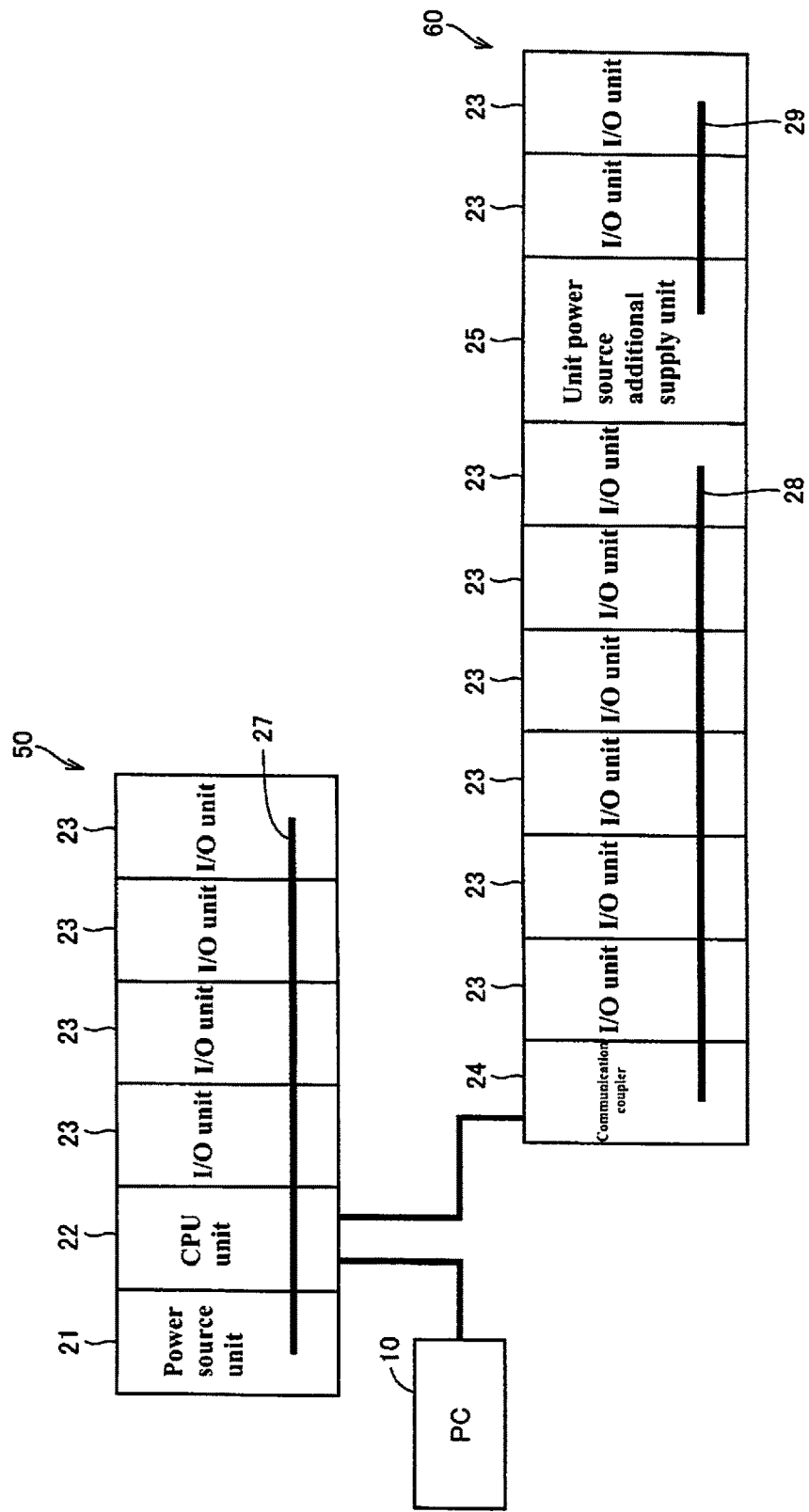
FIG. 1 is a diagram showing one example of the configuration of a control system, which is e.g. to be designed, with an information processing device according to an embodiment.

FIG. 1 is a diagram showing one example of the configuration of the control system, which e.g. to be designed, with the information processing device according to the embodiment. As shown in FIG. 1, the control system includes the PLC 50 and a remote I/O terminal 60. The PC 10 stores the support software for supporting the construction of the control system including the PLC 50, and serves as the PLC support device.

The PLC 50 is connected to the PC 10 by way of a connection cable or the like. The PLC 50 is connected to the remote I/O terminal 60 over a field network. The field network transmits various kinds of data to be exchanged with a CPU unit 22. Ethernet (registered trademark) as used in various industries can be typically utilized as the field network.

The PLC 50 includes the CPU unit 22 executing the main calculation processes, and one or more I/O units 23. These units are configured such that the data is transmitted from the most upstream CPU unit 22 to the most downstream I/O unit 23 (the rightmost I/O unit 23 in the PLC 50 in the example of FIG. 1), allowing the units to operate in accordance with the data, circulating the data between the most upstream CPU unit 22 to the most downstream I/O unit 23. That is to say, the data is transmitted in order from the most upstream CPU unit 22 and the most downstream I/O unit 23, and returned to the most upstream CPU unit 22 from the most downstream I/O unit 23. Meanwhile, each unit reads out and writes the data. These units are connected to a unit power source wiring 27. The power source unit 21 supplies, with the unit power source wiring 27, electric power with a voltage that is appropriate for the unit power source wiring 27. Each unit operates with the electric power supplied from the power source unit 21.

The I/O unit 23 is a unit involving ordinary input and output processes, and manages the input and output of binarized data such as "on" and "off". That is to say, each I/O unit 23 collects information on whether a given object is detected (on) or not (off) with a sensor or the like connected to the I/O unit 23. The I/O unit 23 outputs either one of an activating order (on) for activation and a deactivating order (off) for deactivation to an output target, such as a relay and an actuator.

Furthermore, the remote I/O terminal 60 is connected to the field network in the control system shown in FIG. 1. The remote I/O terminal 60 performs the processes relevant to ordinary input and output processes, basically similarly to the I/O unit 23. More specifically, the remote I/O terminal 60 includes a communication coupler 24 for performing processes relevant to data transmission over the field network, one or more I/O units 23, and a unit power source additional supply unit 25. As explained below, these units are configured to exchange data with each other over a remote I/O terminal bus, which is a system bus (internal bus).

The communication coupler 24 mainly controls the operation (update timing of I/O data and so on) of the I/O units 23, and controls the data transmission between the communication coupler 24 and the PLC 50. The communication coupler 24 is connected to the CPU unit 22 of the PLC 50 via the field network. The communication coupler 24 will be explained below in detail.

The I/O units 23 are responsible for signal input from external switches and sensors, and signal output to external relays and actuators. The I/O units 23 serve to transmit data by way of the communication coupler 24 and the remote I/O terminal bus, and perform ordinary input and output processes. Typically, the I/O units 23 input and output binarized data such as "on" and "off". For example, each I/O unit 23 collects information on whether a given object is detected (on) or not (off) with a detection sensor. The I/O unit 23 gives either one of an activating order (on) (for activation) and a deactivating order (off) (for deactivation) to an output target, such as a relay or an actuator.

A power source voltage is supplied from the communication coupler 24 over the unit power source wiring 28 to the I/O units 23 connected downstream from the communication coupler 24. As shown in FIG. 1, the I/O terminal 60 includes a unit power source additional supply unit 25. For the I/O units 23 connected downstream from the unit power source additional supply unit 25, the power source voltage supplied from the communication coupler 24 is separated by the unit power source additional supply unit 25, and the electric voltage of the unit power source of the unit electric power source is supplied from the unit power source additional supply unit 25 through the unit power source wiring 29.

The PLC 50 and the remote I/O terminal 60 may also be provided with other kinds of units (special units, motion units, and units for communication) as slave devices of the communication coupler 24, in addition to the power source unit 21, the CPU unit 22, the communication coupler 24, the I/O units 23 and the unit power source addition supply unit 25.

Configuration for Electric Power Supply

Figure 2:
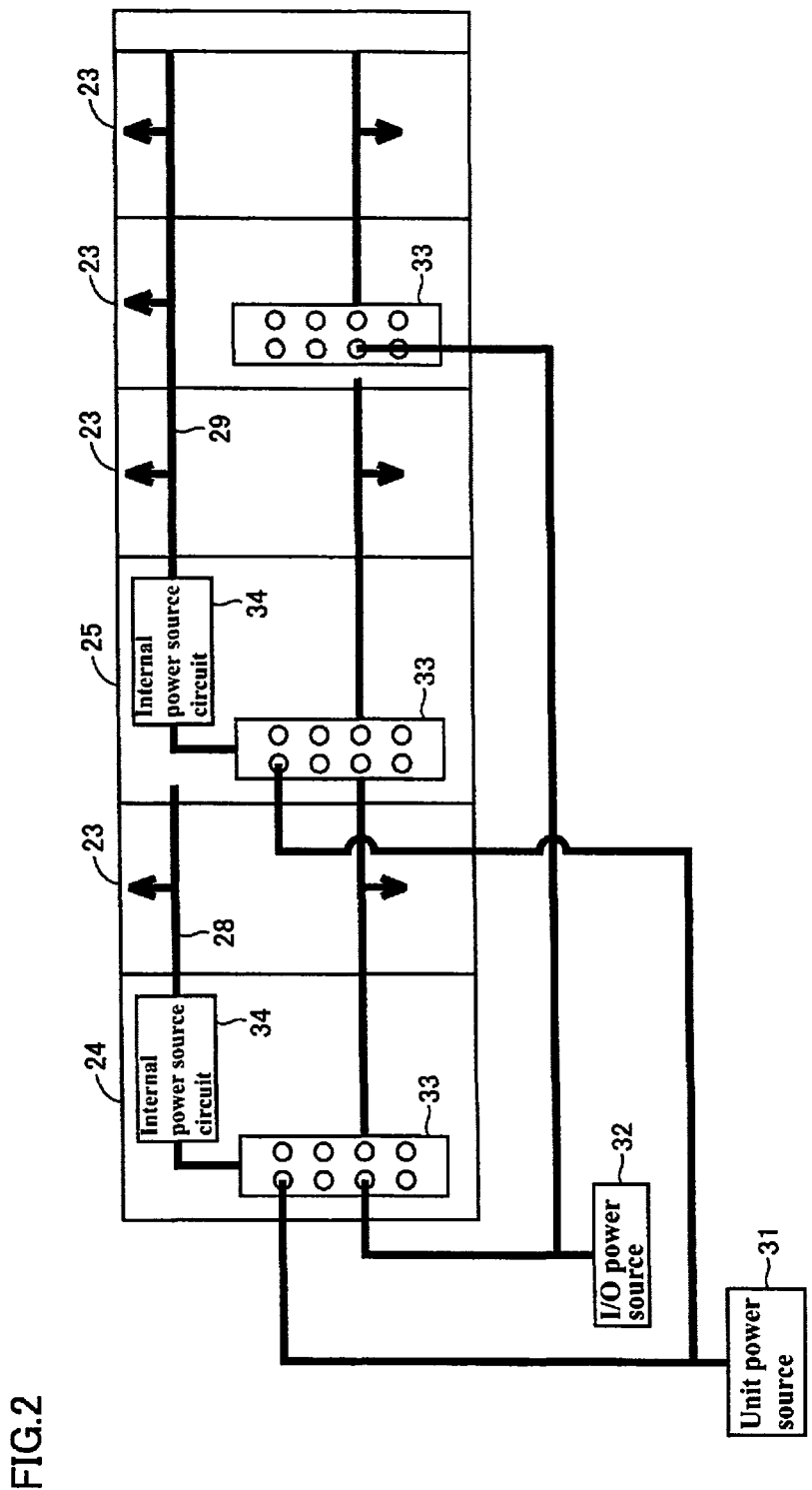
FIG. 2 is a diagram showing an example of the configuration of electric power supply in the control system.

FIG. 2 is a diagram showing an example of the configuration for electric power supply in the control system. As shown in FIG. 2, if the remote I/O terminal 60 is constituted by the communication coupler 24, the I/O units 23 and the unit power source additional supply unit 25, for example, the power source voltage supplied from the unit power source 31 is input to a unit electric power supply terminal 33 of the communication coupler 24, and is supplied to the communication coupler 24 and (at least one of) the I/O units 23 by way of the unit power source wiring 28. When the unit power source additional supply unit 25 is connected downstream from that I/O unit 23, the power source voltage supplied from the I/O unit 23 by way of the unit power source wiring 28 is separated in the unit power source additional supply unit 25. The unit power source additional supply unit 25 receives the power source voltage supplied from the unit power source 31 at a unit power source supply terminal 33, and supplies the power source voltage to the units (I/O units 23 and so on) downstream from the unit power source additional supply unit 25 by way of the unit power source wiring 29.

In the example shown in FIG. 2, electric power supplied from the I/O electric power source 32 is input to the communication coupler 24 and to the I/O units 23 downstream from the unit power source additional supply unit 25. The electric power supplied from the I/O electric power source 32 is received at the unit power source supply terminals 33.

Configuration of Information Processing Device (PC 10)

Figure 3:
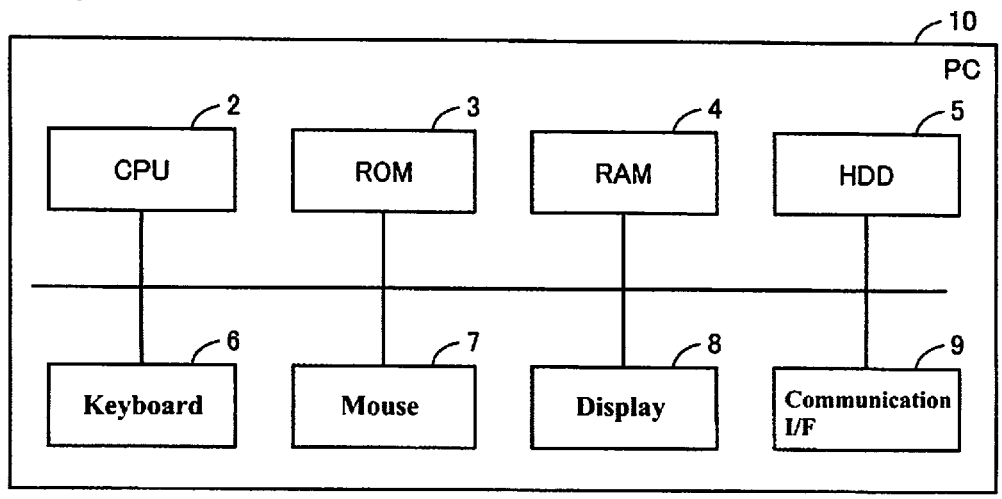
FIG. 3 is a schematic diagram showing the hardware configuration of a PC 10 to be used in connection with a CPU unit 22 according to an embodiment of the present invention.

FIG. 3 is a schematic diagram showing a hardware configuration of the PC 10 to be used connected to the CPU unit 22 according to an embodiment of the present invention. As shown in FIG. 3, the PC 10 is typically constituted by a general-purpose computer. In terms of maintenance, laptop personal computers, which have superior portability, are preferred.

As shown in FIG. 3, the PC 10 includes a CPU 2 to execute various programs including an OS (operating system), a ROM (read only memory) 3 for storing a BIOS (basic input/output system) and various kinds of data, a RAM 4 providing a working area for storing the data required for the program execution with the CPU 2, and a HDD (hard disc drive) 5 storing the programs and the like to be executed by the CPU 2 in a non-volatile way. The PC 10 further includes a keyboard 6 receiving input from users, and a mouse 7, and a display 8 for serving information to users. Moreover, the PC 10 includes a communication interface (I/F) 9 for communicating with the PLC 50 (CPU unit 22) and the like.

The various programs to be executed on the PC 10 are stored on the HDD 5 and the like. Alternatively, it is also possible to arrange the programs to be downloaded from a superordinate host computer or the like via a network.

Figure 4:
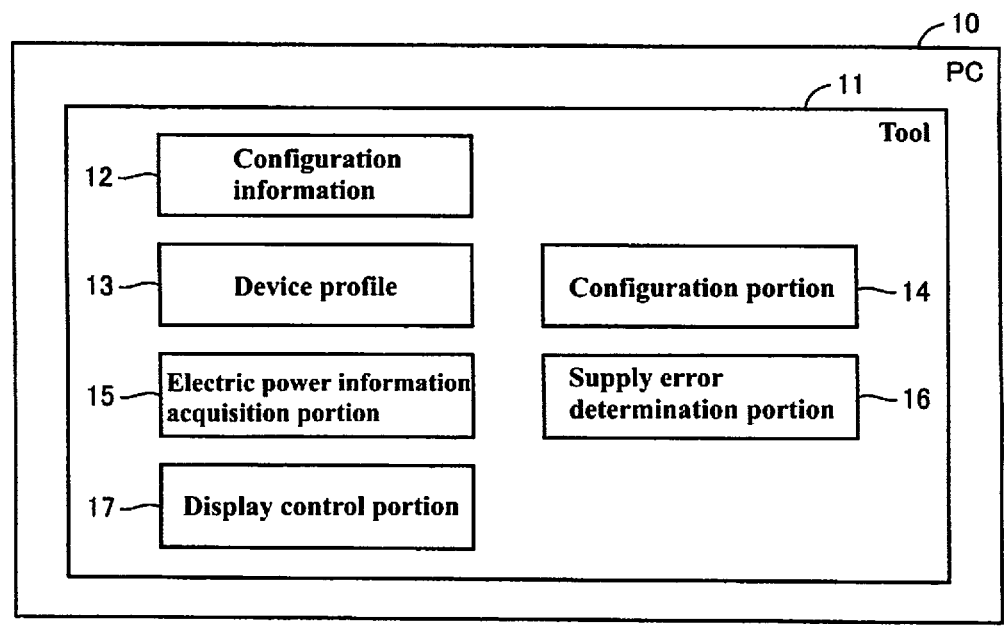
FIG. 4 is a block diagram showing the functionality of the PC 10.

FIG. 4 is a block diagram showing the functionality of the PC 10.

The PC 10 is a computer system (information processing device) provided with an MCU (micro control unit), a ROM (read only memory), a RAM (random access memory) and the like. As shown in FIG. 4, the PC 10 performs the function of a tool 11 for supporting the construction of the control system with the PLC 50. The tool 11 is a program for allowing the PC 10 to perform functions of simulating the configuration of the PLC 50, editing setting information for operating the PLC 50 and allowing users to prepare a user program to be operated in the PLC 50. The tool 11 includes configuration information 12, and a device profile 13. The configuration information 12 is information representing the configuration of the units included in the control system. The device profile 13 is information representing the capabilities of the units constituting the control system. For example, the device profile 13 may include information on the suppliable electric power of the power supply unit (for example, the unit power source additional supply unit 25) for supplying power source voltage to other units, as well as information of electric power consumption of connected units (for example, I/O units 23) operating with the supply of electric power from another unit.

The tool 11 is a program which allows the PC 10 to perform functions of a configuration portion 14, an electric power information acquisition portion 15, a supply error determination portion 16 and a display control portion 17. The configuration portion 14 permits input operations of users, and allows the PC 10 to perform a function of edit the configuration of the units of the control system in response to an operation of adding a unit to the control system shown in the configuration information 12 or an operation of deleting a unit from the control system.

The electric power information acquisition portion 15 acquires the electric power received by the units of the control system shown in the configuration information 12, on the basis of suppliable electric power of the electric power supply unit(s) included in the control system and the electric power consumed by the connected units. The electric power information acquisition portion 15 acquires the electric power to be supplied to the connected units included in the control system by calculating the difference between the electric power that is suppliable by the electric power supply unit(s) connected on the upstream side from of a given connected unit and the total electric power consumed by the other units that are connected on the upstream side of that connected unit and lie between the suppliable power source unit and the connected unit.

The supply error determination portion 16 determines, for each of the units of the control system, whether or not the electric power to be supplied to the units is sufficient, on the basis of the electric power consumed by the corresponding unit, the electric power suppliable by the electric power supply unit connected on the upstream side of the corresponding unit, and the respective electric power consumed by the connected units, which are the connected units downstream from the electric power supply unit and upstream from the corresponding unit. The supply error determination portion 16 then outputs the determination result. The supply error determination portion 16 determines shortage and overage (oversupply) of electric power to be supplied to the units for each unit, by comparing the electric power consumed by each unit of the control system and the electric power to be given to each unit, as acquired by the electric power acquisition unit 15.

The display control portion 17 controls the process of displaying on the display with the PC 10. The display control portion 17 displays the state of the electric power supply on the display 8 in accordance with the determination result of the supply error determination portion 16, for each of the units of the control system. For example, the display control portion 17 displays an image indicating a shortage of electric power to be supplied to the unit, in association with the units with a shortage of electric power supply, on the display 8.

Data

FIGS. 5(A) and 5(B) are diagrams showing unit information 19, that is, information for each unit shown in the device profile 13. FIGS. 5(A) and 5(B) show examples of an electric power supply unit and a connected unit. FIG. 5 (A) shows an example of the capabilities of the power source unit. The unit information 19A shows an example of the capabilities of the electric power supply unit with the product name "unit power source additional supply unit". The electric power supply unit is aimed to supply electric power to other units. Thus, the unit information 19A defines information (the suppliable electric power from the unit is 10.00 (W) in the example of FIG. 5 (A)) of suppliable electric power of the unit shown by the unit information 19A, as well as a formal name and the like.

FIG. 5 (B) shows one example of the capabilities of a connected unit. The unit information 19B shows an example of the capabilities of the connected unit with the product name "DC input unit". The connected unit operates with the supply of power source voltage from other units. Thus, the unit information 19B defines information (the electric power consumed by the unit is 0.50 (W) in the example of FIG. 5 (B)) of electric power consumed by the unit shown by the unit information 19B, as well as a formal name and the like.

Operation

Figure 6:
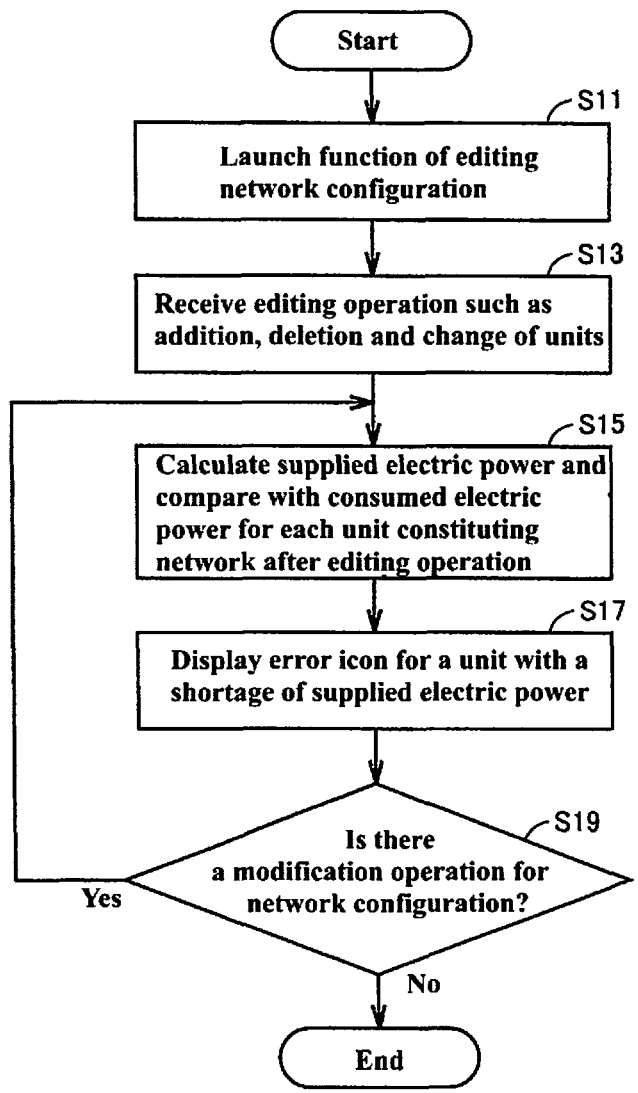
FIG. 6 is a flowchart showing an operation of the PC 10.

FIG. 6 is a flowchart showing the operation of the PC 10.

In step S11, the PC 10 launches a function of editing the configuration of the units included in the control system with the configuration portion 14.

In step S13, the PC 10 permits the operation of editing the configuration of the units included in the control system by the configuration portion 14.

In step S15, referring to the device profiles 13, the PC 10 acquires the electric power supplied to each unit, on the basis of information relevant to the electric power that is suppliable by the electric power supply unit and electric power consumed by the connected units sequentially connected to the electric power supply unit. The PC 10 manages, for each unit in a virtually constructed network, the order (ordinate number) in which the unit is connected to the most upstream unit. For a unit for which the supplied electric power is to be acquired, the PC 10 acquires the order connected to the most upstream unit. The PC 10 sums up the electric power consumed by the units subsequent to the electric power supply unit, on the upstream side from the unit for which the electric power to be supplied is to be acquired, and subtracts the summed up value from the electric power supplied by the electric power supply unit. This process makes it possible to acquire the electric power that can be supplied to each unit. When acquiring the electric power that can be supplied to each unit, the PC 10 compares, with the supply error determination portion 16, the electric power to be supplied to each unit with the electric power consumed by that unit.

In step S17, the PC 10 displays an icon image indicating error on the display 8 with the displaying control unit 17, for those units in which the electric power that can be supplied to that unit is lower than the electric power consumed by the unit (units with a shortage of supplied electric power).

In step S19, when receiving, as a user's operation, an operation for modifying the configuration of the units included in the control system, the PC 10 executes the processing of step S15. The PC 10 terminates the processing, when not receiving an operation for modifying the configuration of the units but receiving an operation for terminating the processing for editing the units constituting the control system.

The PC 10 can be arranged such that, when it displays an icon image indicating an error by the processing in step S17, a message indicating the meaning of the icon image when the user operates the mouse 7 or the like to point the mouse pointer at the icon image indicating an error.

The PC 10 sums up the electric power consumed by the units on the upstream side of the unit in question, subtracts the summed up value from the electric power supplied by the power source unit, and compares the value resulting from the subtraction with the electric power consumed by the unit. Alternatively, the PC 10 can also be arranged to sum up the electric power consumed by the unit, and the electric power consumed by one or more consecutive units which are on the upstream side from the unit and on the downstream side from the electric power supply unit, and to compares the summed up value with the electric power supplied by the electric power supply unit to determine whether there is an overage or shortage of electric power to be supplied to a unit.

Example of a User Interface

One example of an operation screen, which is displayed on the display 8 when the function of the tool 11 is activated by the information processing device in this embodiment, will be explained with reference to FIG. 7, FIG. 8 and FIG. 9.

Figure 7:
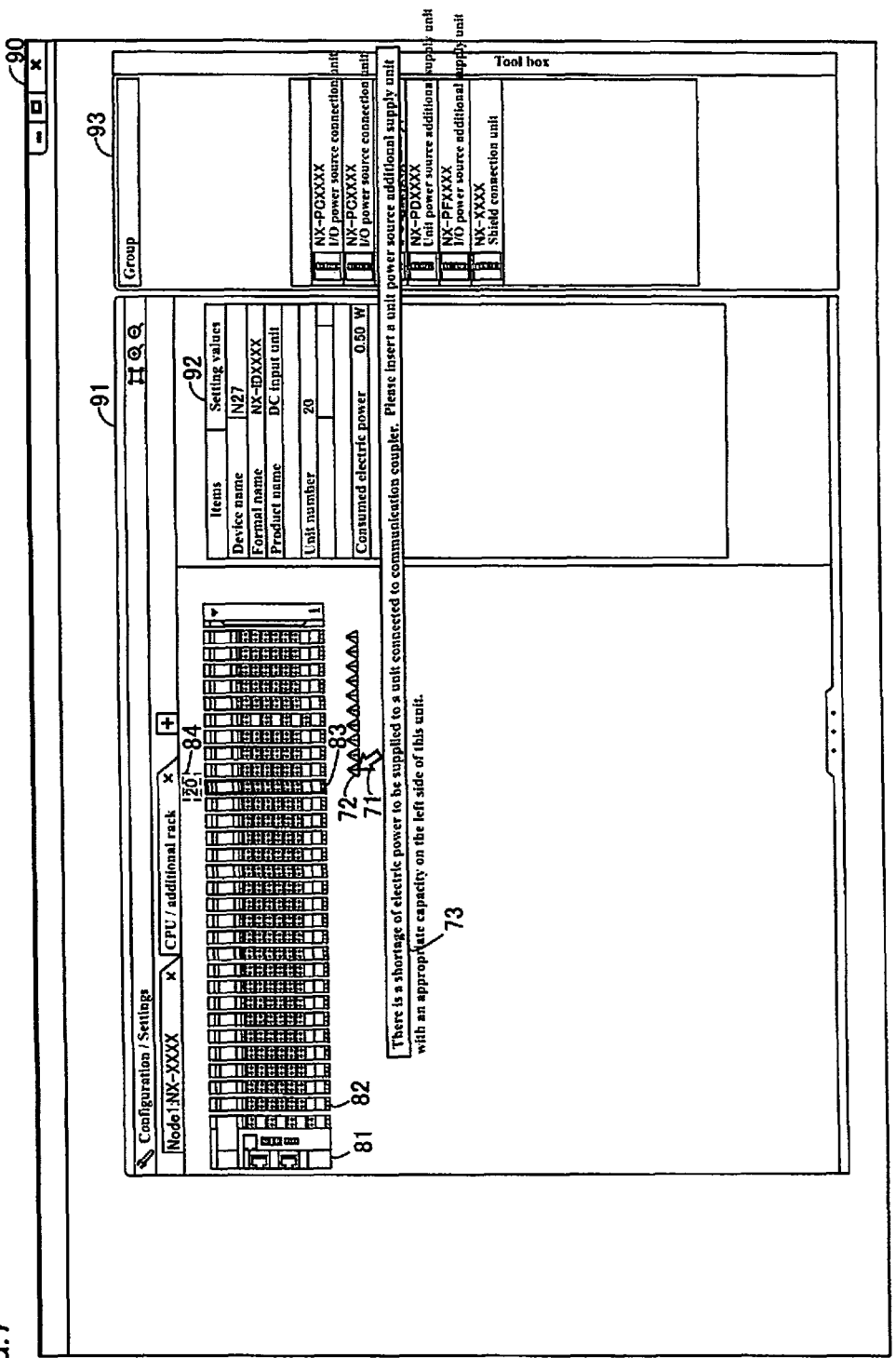
FIG. 7 is a view showing one example of an operation screen which displays shortages and overages (oversupplies) of electric power supply by icon images in case that there is a shortage of electric power to be supplied to the units constituting the control system.

FIG. 7 is a view showing one example of an operation screen which displays icon image indicating shortage and overage of electric power to be supplied for the case that there is a shortage of electric power to be supplied to a unit constituting the control system.

As shown in FIG. 7, the PC 10 displays an operation screen 90 on the display 8, and receives a user's input for operation. The PC 10 displays a simulation result of the configuration of the control system in an editing region 91, and receives a user's operation for such editing as addition, change, and deletion of units.

The PC 10 displays the configuration of the control system currently being edited by the user in the editing region 91. In the example of FIG. 7, the PC 10 displays a configuration composed of a unit image 81 and a plurality of unit images 82. A selected image 83 indicates a unit selected by the user. A unit number 84 is displayed above the selected unit, indicating the order (ordinate number) of the selected unit connected to the unit image 81.

In the example in FIG. 7, unit numbers are assigned to the units connected to the unit image 81 in the order from the upstream to the downstream, and the unit selected by the user is displayed as the twentieth unit connected to the unit image 81. Referring to the device profile 13, the PC 10 displays the capabilities of the unit indicated by the selected image 83 in the device information 92. A selected region 93 shows candidates of the unit to be added in the control system.

The PC 10 displays an icon 72 indicating an error in the editing region 91, for those units with a shortage of supplied electric power. In the example of FIG. 7, there is a shortage of electric power to be supplied to the twenty-first units an following units connected to the unit image 81. The icons 72 are displayed in association with these units. The PC 10 receives a user's input for operating a pointer 71, and displays a message 73 indicating the meaning of the icon when the pointer 71 is placed on the icon 72.

Figure 8:
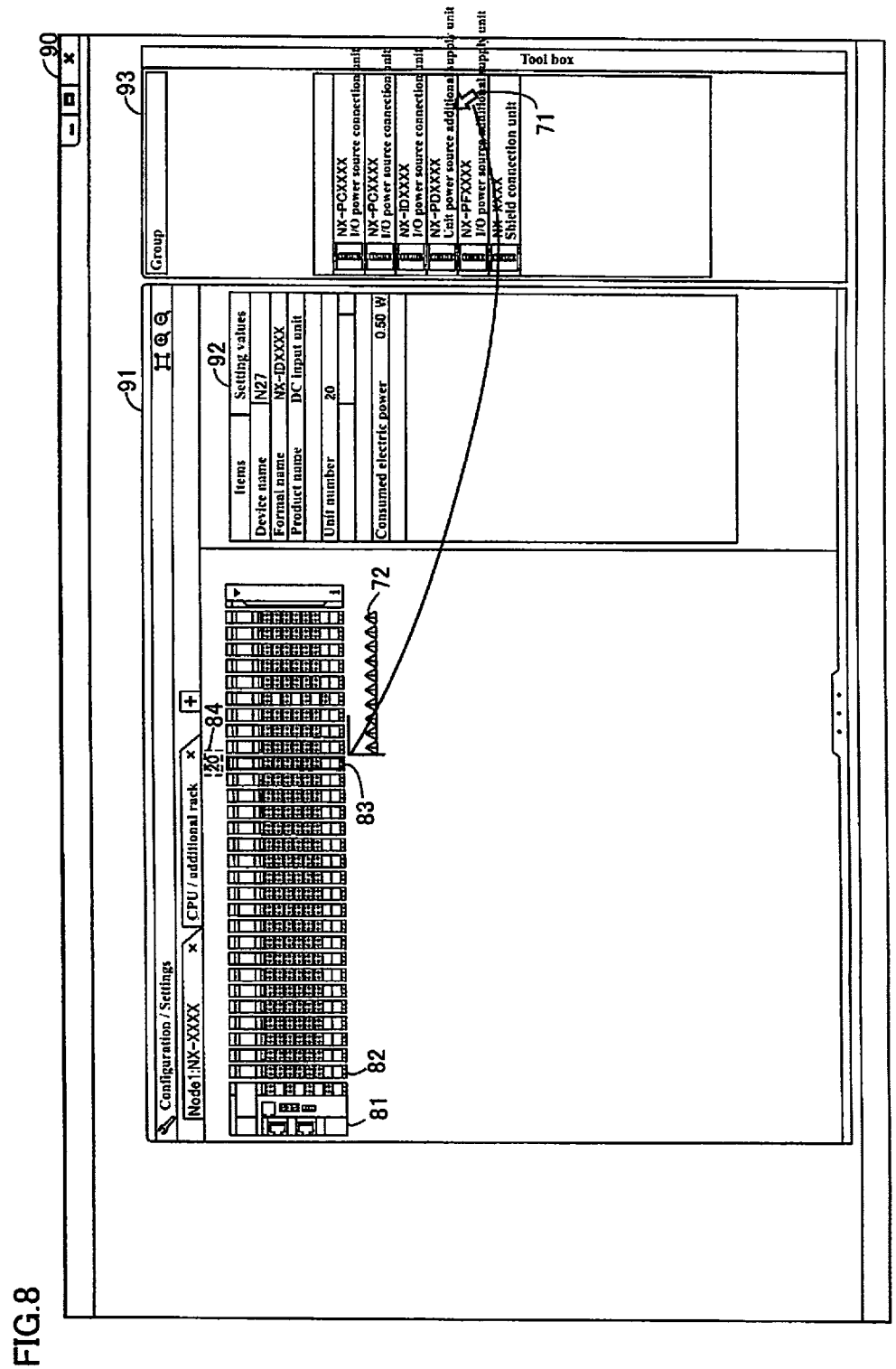
FIG. 8 is a view showing one example of an operation screen for addition of units to the control system.

FIG. 8 is a view showing one example of an operation screen for the addition of units to the control system. As shown in FIG. 8, the PC 10 receives the users' operation of the pointer 71 and the users' operation for selecting an electric power supply unit in the selection region 93. The PC 10 receives a users' operation for selecting the electric power supply unit and adding the electric power supply unit between the twentieth unit and the twenty-first unit connected to the unit image 81.

Figure 9:
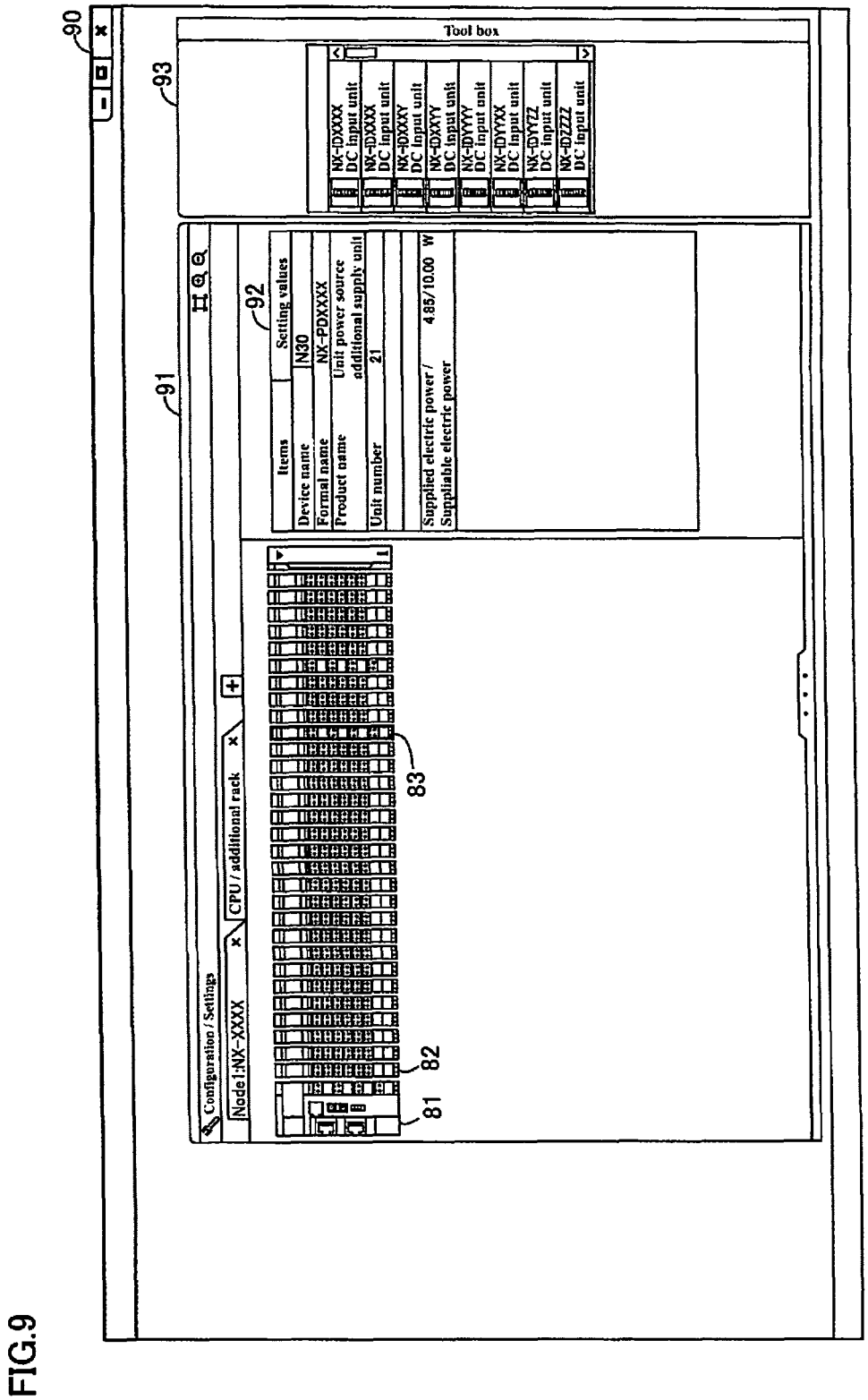
FIG. 9 is a view showing one example of a screen when the shortage of supply of an electric power source has been eliminated by the addition of unit to the control system.

FIG. 9 is a view showing one example of a screen in which the shortage in supply of electric power source has been eliminated by the addition of a unit to the control system. As shown in FIG. 9, an electric power supply unit is added between the twentieth unit and the twenty-first unit connected to the unit image 81 as described in the examples of FIG. 7 and FIG. 8. This electric power supply unit is selected and its capabilities are displayed in the device information 92. The device information 92 shows the electric power suppliable by the electric power supply unit (10.00 (W) in the example of FIG. 9) and the supplied electric power to be supplied to one or more consecutive connected units on the downstream side of the electric power supply unit (4.85 (W) in the example of FIG. 9).

Thus, the PC 10 shows the user any overage or shortage of the electric power supplied to the units constituting the control system, enabling the user to easily design a system.

Summary

When constructing an FA system, it is necessary to configure the system such that optimum total consumed electric power is achieved, so that its performance is maintained and safety of devices is ensured. According to this embodiment, the information processing device identifies any unit with a shortage of electric power capacitance and displays errors when adding units to the system. Thus, it is possible for designers of the system and the like (1) to identify in advance any units with a shortage of electric power without the need for preparing an actual machine, (2) to identify the number of power source units required for constructing the system, (3) to select the optimum power source unit easily and (4) to optimally design the total consumed electric power and the system in parallel, using an information processing device.

A program realizing the present invention can be provided by means of transmission, reception and the like utilizing a network over a communication interface. It should be understood that the embodiments disclosed herein are illustrative and non-restrictive in every respect. The scope of the present invention is defined by the terms of the claims, not by the above explanation, and is intended to include any modifications within the scope and meaning equivalent to the terms of the claims.

LIST OF REFERENCE NUMERALS

10 PC
11 Tool
12 Configuration information
13 Device profile
14 Configuration portion
15 Electric power information acquisition portion
16 Supply error determination portion
17 Display control portion
19 Unit information
21 Power source unit
22 CPU unit
23 I/O unit
24 Communication coupler
25 Unit power source additional supply unit
27 Unit electric power source wiring
28 Unit electric power source wiring
29 Unit electric power source wiring
31 Unit electric power source
32 I/O electric power source
33 Unit electric power source supply terminal
34 Internal power source circuit
50 PLC
60 Remote I/O terminal
61 Processor
62 Memory
63 HDD
64 Communication interface
71 Pointer
72 Icon
73 Message 81 Unit image
82 Unit image
83 Selected image
84 Unit number
90 Operation screen
91 Editing region
92 Device information
93 Selected region

What is claimed is:

1. An information processing device for supporting construction of a network, the network comprising a plurality of units, the plurality of units comprising:
   an electric power supply unit coupled to ones of the plurality of units connected downstream from the electric power supply unit; and
   a connected unit, wherein each of at least some of the ones of the plurality of units connected downstream from the electric power supply unit comprises the connected unit, each of the connected units connected downstream from the electric power supply unit being supplied with electric power from the electric power supply unit by an upstream one of the plurality of units and each of the connected units supply remaining electric power to a connected downstream respective one of the connected units;
   the information processing device comprising:
      a memory portion storing an amount of electric power consumed by each of the connected units and an amount of electric power suppliable by the electric power supply unit;
      a display; and
      a processor configured with a program to perform operations comprising:
         operation as a configuration portion that virtually configures, in response to an input operation comprising one of: addition of a unit to the plurality of units; and removal of a unit from the plurality of units, the network including the connected units and the electric power supply unit to produce a virtually configured network comprising a virtual configuration of the plurality of units in the network;
         operation as a determination portion that determines, for each one of the plurality of units in the virtually configured network, an overage or a shortage of electric power to be supplied to the respective one of the plurality of units, on a basis of the amount of electric power consumed by the respective one of the plurality of units subtracted from the electric power suppliable by the connected unit immediately upstream from the respective one of the plurality of units to produce a determination result; and
         operation as a display portion that displays on the display, for each one of the plurality of units in the virtually configured network, a state of the electric power supply that indicates the overage or the shortage of electric power for the respective one of the plurality of units in the virtually configured network, based on the determination result wherein,
      the processor is configured with the program to perform operations such that operation as the determination portion comprises operation as the determination portion that determines the electric power suppliable by the connected unit immediately upstream from the respective one of the plurality of units in the virtually configured network based on a sum of the amount of electric power consumed by each of the connected units upstream from the respective one of the plurality of units subtracted from the amount of electric power suppliable by the electric power supply unit.

2. The information processing device according to claim 1,
   wherein the processor is configured with the program to perform operations such that operation as the determination portion comprises operation as the determination portion that determines, for each one of the plurality of units in the virtually configured network, the overage or the shortage of electric power to be supplied to the respective one of the plurality of units by comparing the electric power that is suppliable by the electric power supply unit upstream and nearest to the respective one of the plurality of units with the sum of the amount of electric power consumed by the respective one of the plurality of units and the amount of electric power consumed by one or more consecutive connected units downstream from the nearest electric power supply unit and the connected unit immediately upstream from the respective one of the plurality of units.

3. The information processing device according to claim 1,
   wherein the processor is configured with the program to perform operations such that:
   operation as the configuration portion comprises operation as the configuration portion that receives an input operation for updating the virtual configuration of the plurality of units in the network, and
   in response to the input operation, operation as the determination portion comprises operation as the determination portion that determines, for each one of the plurality of units included in the updated virtually configured network, the overage or the shortage of electric power to be supplied to the respective one of the plurality of units included in the updated virtually configured network.

4. The information processing device according to claim 1,
   wherein the processor is configured with the program to perform operations such that operation as the display portion displays the virtual configuration of the plurality of units in the network, and displays a predetermined image in association with any of the plurality of units included in the virtual configuration that is determined by the determination portion to have the shortage of electric power to be supplied.

5. The information processing device according to claim 1,
   wherein the processor is configured with the program to perform operations such that operation as the display portion displays the virtual configuration of the plurality of units in the network, displays a predetermined image in accordance with the determination result of the determination portion in association with each of the plurality of units included in the virtual configuration, and displays text information indicating the determination result of the determination portion in response to an input operation regarding the predetermined image.

6. The information processing device according to claim 3,
wherein the processor is configured with the program to perform operations such that operation as the display portion displays the updated virtual configuration of the plurality of units in the network, and displays a predetermined image in association with any of the plurality of units included in the updated virtual configuration of the plurality of units in the network that is determined by the determination portion to have the shortage of electric power to be supplied.

7. The information processing device according to claim 3,
wherein the processor is configured with the program to perform operations such that operation as the display portion displays the updated virtual configuration of the plurality of units in the network, displays a predetermined image in accordance with the determination result of the determination portion in association with each one of the plurality of units included in the updated virtual configuration of the plurality of units in the network, and displays text information indicating the determination result of the determination portion in response to an input operation regarding the predetermined image.

8. The information processing device according to claim 6,
wherein the processor is configured with the program to perform operations such that operation as the display portion displays the updated virtual configuration of the plurality of units in the network, displays the predetermined image in accordance with the determination result of the determination portion in association with each one of the plurality of units included in the updated virtual configuration of the plurality of units in the network, and displays text information indicating the determination result of the determination portion in response to an input operation regarding the predetermined image.

9. A non-transitory computer-readable medium storing instructions that, when executed, cause a processor to perform operations to control an information processing device for supporting construction of a network, the network comprising a plurality of units, the plurality of units comprising:
an electric power supply unit coupled to ones of the plurality of units connected downstream from the electric power supply unit, and
a connected unit, wherein each of at least some of the ones of the plurality of units connected downstream from the electric power supply unit comprises the connected unit, each of the connected units connected downstream from the electric power supply unit being supplied with electric power from the electric power supply unit by an upstream one of the plurality of units and each of the connected units supply remaining electric power to a connected downstream one of the connected units;
the information processing device comprising:
the processor;
a display; and
a memory that stores an amount of electric power consumed by each of the connected units and an amount of electric power that is suppliable by the electric power supply unit;
wherein
the instructions cause the processor to perform operations comprising:
virtually configuring the network including the connected units and the electric power supply unit, in response to an input operation comprising one of: addition of a unit to the plurality of units; and removal of a unit from the plurality of units on the information processing device to produce a virtually configured network comprising a virtual configuration of the plurality of units in the network;
determining, for each one of the plurality of units in the virtually configured network, an overage or shortage of electric power to be supplied to the respective one of the plurality of units, on a basis of the amount of electric power consumed by the respective one of the plurality of units subtracted from the electric power suppliable by the connected unit immediately upstream from the respective one of the plurality of units to produce a determination result, the electric power suppliable by the connected unit immediately upstream from the respective one of the plurality of units in the virtually configured network being determined based on a sum of the amount of electric power consumed by each of the connected units upstream from the respective one of the plurality of units subtracted from an amount of electric power suppliable by the electric power supply unit; and
displaying, on the display, for each one of the plurality of units in the virtually configured network, a state of the electric power supply that indicates the overage or the shortage of electric power for the respective one of the plurality of units, based on the determination result.

10. The non-transitory computer-readable medium according to claim 9, wherein the instructions cause the processor to perform operations such that
determining, for each one of the plurality of units included in the virtually configured network, the overage or the shortage of electric power to be supplied to the respective one of the plurality of units, on the basis of the amount of electric power consumed by the respective one of the plurality of units subtracted from the electric power suppliable by the connected unit immediately upstream from the respective one of the plurality of units to produce the determination result comprises:
comparing the electric power suppliable by the electric power supply unit immediately upstream and nearest to the respective one of the plurality of units with the sum of the amount of electric power consumed by the respective one of the plurality of units and the amount of electric power consumed by one or more consecutive connected units downstream from the nearest electric power supply unit and upstream from the respective one of the plurality of units.

11. The non-transitory computer-readable medium according to claim 9, wherein the instructions cause the processor to perform operations further comprising:
updating the virtually configured network based on an additional input operation;
determining, for each one of the plurality of units included in the updated virtually configured network, the overage or the shortage of electric power to be supplied to the respective one of the plurality of units included in the updated virtually configured network to produce an updated determination result; and
displaying an updated state of the electric power supply for each one of the plurality of units in the updated virtually configured network, based on the updated determination result.

12. The non-transitory computer-readable medium according to claim 9, wherein
    displaying, on the display, for each one of the plurality of units in the virtually configured network, the state of the electric power supply for each one of the plurality of units included in the virtually configured network, based on the determination result comprises:
    displaying the virtual configuration of the plurality of units in the network and a predetermined image in association with any of the plurality of units in the virtual configuration of the plurality of units in the network determined to have the shortage of electric power to be supplied.

13. The non-transitory computer-readable medium according to claim 9, wherein
    displaying, on the display, for each one of the plurality of units in the virtually configured network, the state of the electric power supply for each one of the plurality of units included in the virtually configured network, based on the determination result comprises:
    displaying the virtual configuration of the plurality of units in the network, a predetermined image in accordance with the determination result in association with each of the plurality of units included in the virtual configuration of the plurality of units in the network, and text information indicating the determination result, in response to an input operation regarding the predetermined image.

14. The non-transitory computer-readable medium according to claim 11, wherein
    displaying, on the display, for each one of the plurality of units in the virtually configured network, the state of the electric power supply for each one of the plurality of units included in the virtually configured network, based on the determination result comprises:
    displaying the virtual configuration of the plurality of units in the network and a predetermined image in association with any of the plurality of units in the virtual configuration of the plurality of units in the network determined to have the shortage of electric power to be supplied.

15. The non-transitory computer-readable medium according to claim 11, wherein
    displaying, on the display, the state of the electric power supply for each one of the plurality of units included in the virtually configured network, based on the determination result comprises:
    displaying the virtual configuration of the plurality of units in the network, a predetermined image in accordance with the determination result in association with each of the plurality of units included in the virtual configuration of the plurality of units in the network, and text information indicating the determination result, in response to an input operation regarding the predetermined image.

16. The non-transitory computer-readable medium according to claim 14, wherein
    displaying, on the display, for each one of the plurality of units in the virtually configured network, the state of the electric power supply for each one of the plurality of units included in the virtually configured network, based on the determination result comprises:
    displaying the virtual configuration of the plurality of units in the network, the predetermined image in accordance with the determination result in association with each of the plurality of units included in the virtual configuration of the plurality of units in the network, and text information indicating the determination result, in response to an input operation regarding the predetermined image.

\* \* \* \* \*